April 7, 1953   E. R. DERRINGTON   2,633,860
SEQUENTIAL AND DIFFERENTIAL VALVE ACTUATION
Filed April 4, 1947
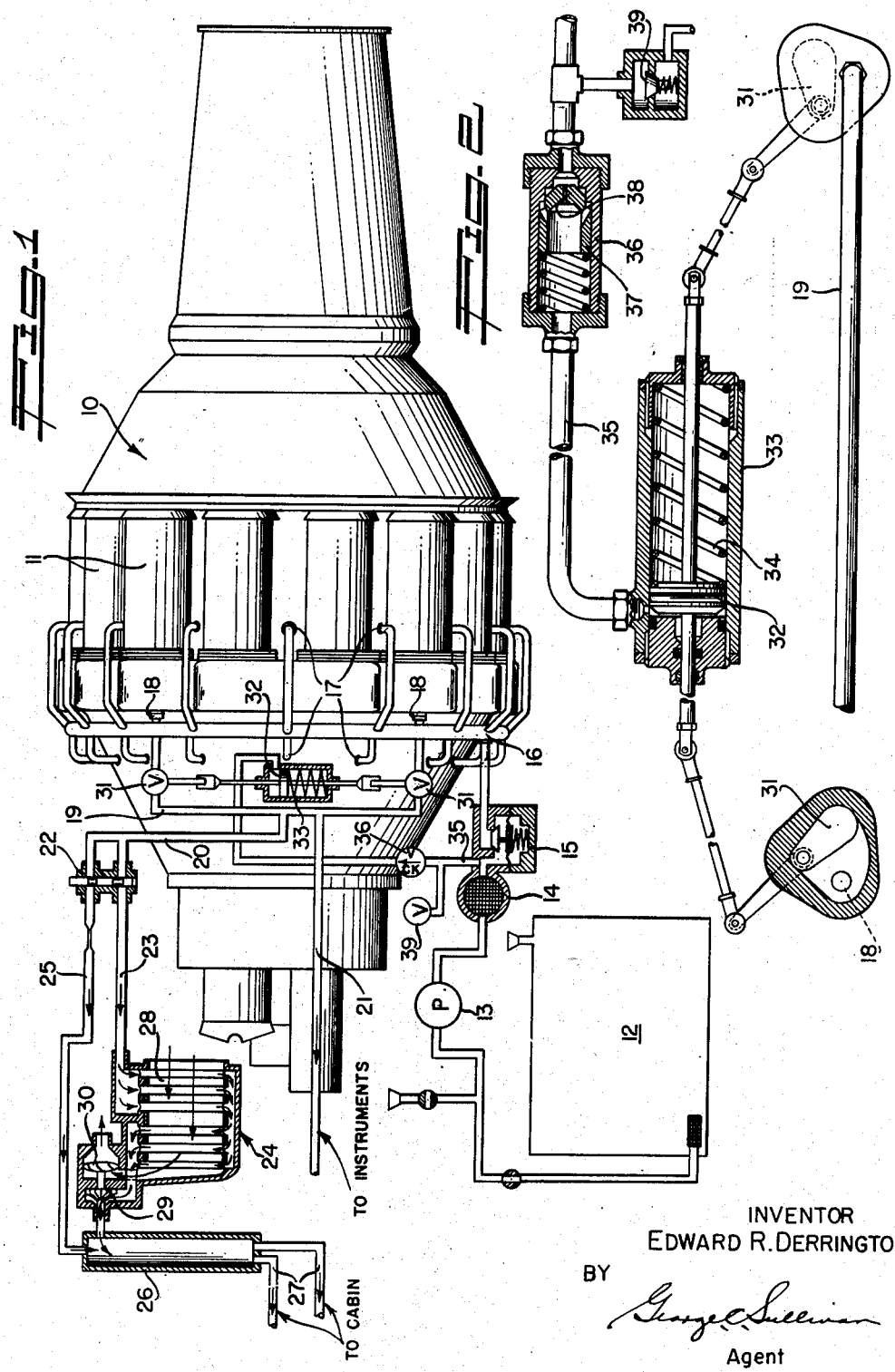
INVENTOR
EDWARD R. DERRINGTON
BY
*George C. Sullivan*
Agent Patented Apr. 7, 1953

2,633,860

UNITED STATES PATENT OFFICE 2,633,860

SEQUENTIAL AND DIFFERENTIAL VALVE ACTUATION

Edward R. Derrington, Montrose, Calif., assignor to Lockheed Aircraft Corporation, Burbank, Calif.

Application April 4, 1947, Serial No. 739,495

3 Claims. (Cl. 137—109)

This invention relates to an improved and simplified means for automatic sequencing and/or differential operation of valves wherein the operation of one fluid circuit controls the direct or differential operation of another fluid circuit. In a more restricted sense the invention relates to the alternative operation of two fluid circuits with a differential or time delay between the "on" and "off" energization of the control of one of said circuits.

This invention will be described and explained in connection with the cabin pressurization of gas turbine driven aircraft, whether propeller or jet driven. In such aircraft, of which the P-80 "Shooting Star" is an example, it is permissible to bleed limited quantities of compressed air from the compressor of the gas turbine, for creating a positive pressure in the pilot's cockpit or cabin at high elevations, thus avoiding the need of separate cabin pressurizing equipment. Since the compression pressure in the turbine compressor varies over wide limits with consequent variations in the compression temperature of the air so supplied, it has been found necessary to provide an air-cycle refrigeration unit including an air turbine driven at high speed, the presence of which turbine in the system prevents a sudden start of the air flow because of the desirability of a gradual or time-delayed acceleration of the turbine to operating speed. Accordingly, one feature of the specific application of my invention chosen for illustration herein relates to an automatic time-delayed or gradual opening of the air circuit after a period of shut down.

In this particular installation the gas turbine compressor may have an intermittent water and/or alcohol mixture injection system to provide a short period of maximum power for emergency or take-off purposes. To so inject a water and/or alcohol mixture would load the cabin air bleed with moisture and toxic vapors, causing condensation in the cockpit and corrosion in the flight instruments also supplied from the cabin air pressure line. Accordingly, it is desirable to automatically shut off the cabin air pressure line before the start of the injection period, and to restore the cabin air supply at the earliest moment within the acceleration limitations of the air cycle refrigeration turbine.

It is, accordingly, an object of this invention to provide an integrated control of two related services, such as air supply and fluid injection, wherein the squencing of the controls of the two services are differentially controlled from a time delay standpoint as between operation in one direction and operation in reverse. Examples of such systems wherein the coordination of two supply systems can advantageously be differentially controlled include fuel and air supplies for internal combustion engines, oil burners, and the like, as well as the water and/or alcohol injection system chosen for illustrative purposes herein.

On the drawing:

Figure 1 is a schematic diagram of a jet turbine equipped with an emergency fluid injection system wherein cabin pressurizing air is withdraw from the turbine compressor, my invention being applied thereto to shut off the cabin air upon starting the fluid injection and to delay the restoration of the cabin air supply upon cessation of the fluid injection to the compressor.

Figure 2 is an enlarged fragmentary detail of the arrangement of this invention as applied in Figure 1.

As shown on the drawing, a jet engine or turbine 10, of a type having a centrifugal compressor and a series of combustion chambers 11, is shown in elevation since the details thereof are not involved herein. A fluid injection system, as used with the turbine, is also shown schematically as a fluid tank 12 from which a pump 13 delivers the fluid to a filter 14 and a diaphragm controlled valve 15 and thence to a manifold 16 and individual injectors 17 discharging into the throats of the centrifugal compressor impeller (not shown). Because of the peculiarities of the inlets to the compressor throats and the discharge to the several combustion chambers it was necessary to use a pair of injectors corresponding to each combustion chamber, hence the complicated manifold and injection system.

A limited quantity or percentage of the air compressed by the turbine can be withdrawn therefrom for operation of a cockpit pressurizing system and various pneumatically operated devices in the airplane, of which the flight instruments are examples. However, to withdraw all this air from one point would disturb the combustion in the combustion chamber receiving its air charge from adjacent such point, accordingly two or more taps 18 are used to withdraw compressed air from the compressor discharge scroll and are connected together by a manifold 19 from which lines 20 and 21 supply the cabin air and instruments respectively.

Since the act of compression heats the air, this compressed air may be directly used to heat the cabin when conditions so require; and under other conditions it may be necessary to cool the air before delivery to the cabin. Accordingly, the line 20 is divided and the divided lines are controlled by a mixing and bypass valve 22 which supplies either or both a conduit 23 to an air cycle refrigeration unit 24 or a conduit 25 bypassing the unit 24. The air flowing in the conduits 23 and 25 is merged and mixed in a manifold 26 whence it is released to the cabin cockpit through one or more conduits 27.

The air flow in conduit 23 to the unit 24 passes through an intercooler 28 and thence through an air turbine 29 which in turn drives a fan 30 inducing a cooling air flow through the intercooler 28. The turbine 29 extracts heat from the cabin air supply in addition to the cooling effect of the intercooler, and operates at such a high speed that consideration must be given to acceleration induced stresses by limiting the impact of the air thereon during the accelerating period.

The foregoing description relates to the fluid injection and cabin pressurization arrangements as associated with or applied to the jet turbine used in the P-80 airplane. The fluid injection system described is used to obtain maximum or emergency power for a short time, and it has been found that the fluid so injected into the turbine compressor acts to also humidify the air withdrawn therefrom for the operation of the flight instruments and the pressurization of the cockpit at high altitudes. The excess or excessive humidity, even though supplied for only a short time interval, resulted in rusting and/or malfunctioning of the flight instruments, and fogging in and condensation on the cold walls of the cockpit and the cockpit canopy.

The apparatus of this invention comprises gate valves 31 simultaneously opening or closing the connection between the taps 18 and the manifold 19, which valves are simultaneously operated by a piston 32 in a cylinder 33 as shown in Figure 2. The piston 32 is urged to the valve open position by a spring 34 and moved to the valve closed position by pressure in the fluid injection circuit, which is tapped at the diaphragm controlled valve 15 by a conduit 35 leading to the cylinder 33.

The valve 15 is spring loaded so that the diaphragm will not open it until the pump 13 builds up a working pressure of about 20 pounds in the fluid, thus delaying fluid injection until sufficient pressure is available to assure proper injection at the nozzles 17. This pressure build up diverts the initial fluid delivery to the cylinder 33, the spring 34 being so chosen that the piston 32 will be moved to the right to close the air taps 18 before the start of injection upon opening of the valve 15.

A one way restriction or check valve 36 in the conduit 35 has a poppet 37, is spring loaded to open for full flow from the valve 15 to the cylinder 33 and to close to restrict the return flow or bleed by a small orifice 38 in the poppet 37 thus delaying the return movement of the piston 32 upon loss of pressure in the fluid injection circuit. This gives a time-delay period for the gradual restoration of the cabin pressure air supply after fluid injection into the turbine compressor has ceased.

If desired, a spring opened drain valve 39 may be connected to the conduit 35 to provide positive drainage of the latter in the event back flow through the idle pump 13 is insufficient to restore the cabin pressure air in the desired time interval. The valve 39 can be set to open at a pressure below that needed to operate the piston 32 so that it will be closed by fluid pressure in the conduit 35 but will open as the pressure below the check valve 36 is released, to permit the check valve 36 to control the bleeding or fluid return from the cylinder 33.

It will thus be seen that I have provided means automatically to shut off the air bleeds for the instruments and cockpit pressurization upon or before starting fluid injection, and to restore the air supply upon completion or shut-off of the fluid injection. The restoration of the air supply to the cockpit is desirably delayed or restricted to the permissible rate of acceleration of the refrigeration turbine. The apparatus as hereinbefore described provides an improved and simplified control for such purposes that is entirely automatic in action, to preclude damage or neglect resulting from pilot inattention or error.

Having thus described my invention and the present preferred embodiments thereof, I desire to emphasize the fact that many modifications may be resorted to in a manner limited only by a just interpretation of the following claims.

I claim as my invention:

1. In combination with a turbo-compressor wherein the compressor is bled to provide a source of compressed air, and said compressor has a fluid injection system to provide short bursts of increased power, a sequencing control for both the bled air and the fluid injection system, including at least one shut off valve associated with the compressor air bleed, means for operating said shut off valve comprising a valve operating mechanism arranged to close said shut off valve in response to fluid pressure in said fluid injection system, a preloaded shut off valve in the fluid injection system opening in response to a higher pressure than that required to operate said first mentioned shut off valve, a fluid connection from the fluid injection system to said mechanism, and a check valve in said fluid connection with a bleed opening therethrough so arranged as to delay the reopening movement of said valve operating mechanism upon release of pressure thereon.

2. In combination with a turbo-compressor wherein the compressor is bled to provide a source of compressed air, and said compressor has a fluid injection system to provide short bursts of increased power, a sequencing control for both the bled air and the fluid injection system, including at least one shut off valve associated with the compressor air bleed, means for operating said shut off valve comprising a valve operating mechanism arranged to close said shut off valve in response to fluid pressure in said fluid injection system, a preloaded shut off valve in the fluid injection system opening in response to a higher pressure than that required to operate said first mentioned shut off valve, a fluid connection from the fluid injection system to said mechanism, a check valve in said fluid connection with a bleed opening therethrough so arranged as to delay the reopening movement of said valve operating mechanism upon release of pressure thereon, and means for bleeding said fluid connection upon release of pressure therein when the fluid injection system is not operating.

3. A sequencing control for inter-related primary and secondary working fluid supply circuits where the primary fluid circuit must be shut off when the secondary fluid circuit is operating, comprising a control valve in said primary fluid circuit, spring returned fluid operated means for said control valve having a fluid connection to said secondary fluid circuit, said means being arranged to close said control valve when subjected to fluid pressure in said secondary fluid circuit, a preloaded pressure responsive valve normally closing said secondary fluid circuit arranged to build up pressure in said fluid connection to close said control valve prior to delivery of fluid through said secondary fluid circuit, and a bleeder type check valve in said fluid connection arranged to slow down the release of fluid from said spring returned fluid operated means upon de-energization of the secondary fluid circuit.

EDWARD R. DERRINGTON.

REFERENCES CITED

The following references are of record in the file of this patent:

UNITED STATES PATENTS

| Number | Name | Date |
|---|---|---|
| 640,767 | Hoffman | Jan. 9, 1900 |
| 757,692 | Thompson | Apr. 19, 1904 |
| 929,852 | Hosford | Aug. 3, 1909 |
| 1,525,859 | Ferrari | Feb. 10, 1925 |
| 1,591,671 | Flanders | July 6, 1926 |
| 1,861,742 | Hand | June 7, 1932 |
| 1,905,065 | Sholl | Apr. 25, 1933 |
| 1,980,478 | Frentzel | Nov. 13, 1934 |
| 2,038,998 | Hammond | Apr. 28, 1936 |
| 2,559,814 | Whittle | July 10, 1951 |

FOREIGN PATENTS

| Number | Country | Date |
|---|---|---|
| 471,540 | Great Britain | 1937 |
| 67,997 | Sweden | 1927 |